(12) United States Patent
Volk (10) Patent No.: US 7,445,225 B2
(45) Date of Patent: Nov. 4, 2008

(54) SAIL-PROPELLED VEHICLE

(76) Inventor: Thomas M. Volk, 4401 Pomona St., Ventura, CA (US) 93003

(*) Notice: Subject to any disclaimer, the term of this patent is extended or adjusted under 35 U.S.C. 154(b) by 386 days.

(21) Appl. No.: 11/308,381

(22) Filed: Mar. 20, 2006

(65) Prior Publication Data

US 2006/0207807 A1    Sep. 21, 2006

Related U.S. Application Data

(60) Provisional application No. 60/664,165, filed on Mar. 21, 2005.

(51) Int. Cl.
*B62K 13/00* (2006.01)

(52) U.S. Cl. .................... 280/282; 280/265; 280/1; 280/213; 280/810; 280/16

(58) Field of Classification Search ............. 280/213, 280/280.1, 265, 1, 810, 16
See application file for complete search history.

(56) References Cited

U.S. PATENT DOCUMENTS

| | | | | |
|---|---|---|---|---|
| 3,572,740 A | | 3/1971 | Rypinski | |
| 4,049,287 A | * | 9/1977 | Dudouyt | 280/213 |
| 4,332,395 A | * | 6/1982 | Zech | 280/213 |
| 4,408,772 A | * | 10/1983 | Hollwarth | 280/1 |
| 4,617,871 A | | 10/1986 | Yau | |
| 4,740,000 A | | 4/1988 | Moessner | |
| 4,925,200 A | * | 5/1990 | Jones | 280/233 |
| 5,829,772 A | * | 11/1998 | Jones | 280/234 |
| 5,873,588 A | | 2/1999 | Swetish | |
| 5,901,973 A | * | 5/1999 | Warren | 280/260 |
| 6,179,314 B1 | * | 1/2001 | Jones | 280/282 |
| 7,182,355 B1 | * | 2/2007 | MacTaggart | 280/213 |
| 2003/0146615 A1 | | 8/2003 | Beckett | |

* cited by examiner

*Primary Examiner*—Joanne Silbermann
*Assistant Examiner*—Michael R Stabley
(74) *Attorney, Agent, or Firm*—Kelly Lowry & Kelley, LLP (57) ABSTRACT

A land sail-propelled vehicle includes a one-piece molded body defining a seat in a top surface thereof. At least one tubular rear axle guide is bonded to, or molded into, a rear portion of the body. A rear axle assembly, including at least one rear axle, is removably insertable into the at least one rear axle guide. A tubular port is bonded to, or molded into, a front portion of the body. A steering assembly is removably insertable into the port. Tires, ice blades, or the like are attachable to the ends of the rear axle assembly and steering assembly so as to engage an underlying solid surface. A sail assembly is detachably connected to the steering assembly to propel the vehicle.

22 Claims, 4 Drawing Sheets

SAIL-PROPELLED VEHICLE

BACKGROUND OF THE INVENTION

The present invention generally relates to vehicles or crafts which are propelled by a sail, in much the same fashion as a sail boat. More particularly, the present invention relates to a sail-propelled vehicle which is collapsible so as to be easily stored and transported, which is relatively inexpensive, and simple to set up and operate.

Sailing vehicles have existed since the earliest antiquity in Egypt, and then in China. In Europe, numerous types of vehicles with sails have been constructed, notably in the $16^{th}$, $17^{th}$, $18^{th}$ and $19^{th}$ centuries. However, it was at the beginning of the $20^{th}$ century that the first competitions were organized. Since 1945, so-called beach sailors have been built at the beaches of the European Atlantic and North Sea coast. These vehicles are up to 800 pounds and can have a sail size of in excess of forty-five square feet. These vehicles are relatively heavy and unwieldy and their assembly normally takes several hours. Moreover, these types of vehicles require custom-made trailers for transportation.

A more recent development is a "land yacht" or "land sail" which are vehicles supported by wheels for operation on a beach, dry lake, road or other solid surface. The recreational use of such vehicles has increasingly gained popularity.

However, a continuing problem with such land sails or land yachts is that they are typically large and therefore difficult to store, handle and transport. This can reduce the enjoyment of use of the land sail for recreational purposes. Also, many such vehicles are difficult and time consuming to erect, some requiring at least forty-five minutes by two people. Further, such land sail vehicles at present are typically complex devices which involve significant costs to manufacture. The traditional construction of land sails is to build a tubular frame and put a sail and cloth seat on it. The frame is generally made of steel pipe welded together to support the wheels, the mast step for the sail, and the seat. However, such construction requires a trailer to transport and is not conducive to storing and transportation.

Accordingly, there is a continuing need for a sail propelled vehicle which is collapsible so as to be easily transported and stored. Such a vehicle should be capable of being assembled by one person in a very short time period. Moreover, such a vehicle should be relatively inexpensive. The present invention fulfills these needs and provides other related advantages.

SUMMARY OF THE INVENTION

The present invention relates to a land sail-propelled vehicle which is designed to be easily assembled, transported and stored. The vehicle of the present invention generally comprises a one-piece molded body defining a seat in a top surface thereof. Typically, the body is comprised of molded plastic or fiberglass. At least one tubular rear axle guide is bonded to, or molded into, a rear portion of the body, and has an entry opening. A tubular port is bonded to, or molded into, a front portion of the body and has an entry opening. A rear axle assembly, including at least one rear axle, is removably insertable into the at least one rear axle guide. A steering assembly is removably inserted into the entry opening of the port. Means for movably engaging an underlying solid surface, such as a tire, ski, or ice blade, is attached to generally opposite ends of the rear axle assembly and the steering assembly.

In a particularly preferred embodiment, the steering assembly comprises a tube having a first end adapted to be removably inserted into the opening of the front port. A stem is attached to a second end of the tube, and has a foot bar and a port rotatably attached thereto. A crossbar extends upwardly from the tube and is adapted to attach to a means for propelling the vehicle. The tube preferably includes a series of apertures alignable with an aperture formed in the port for adjustably securing the tube thereto. Moreover, in a particularly preferred embodiment, the footbar is pivotably connected to the stem. This enables users of different heights to operate the steering assembly comfortably.

Typically, the rear axle guide includes an aperture which is alignable with an aperture of the at least one rear axle for insertion of a pin therethrough, so as to fasten the at least one rear axle to the rear axle guide and body. In a particularly preferred embodiment, the inner surface of the tubular rear axle guide is multi-faceted. The at least one rear axle comprises a multi-faceted tube adapted to be insertable into the rear axle guide. In a preferred embodiment, the rear axle assembly includes two rear axles removably insertable into opposite openings of the rear axle guide tube. An extension is removably attachable to an opposite end of each of the rear axles. The extension includes a threaded portion at a free end thereof for removable attachment of the tire, ice blade, etc.

Although the vehicle can be propelled by different means, in a particularly preferred embodiment, the propulsion means comprises a sail assembly, including a mast detachably connected to the crossbar of the steering assembly, a sail attached to the mast, and a boom operably connected to the sail. Typically, the mast comprises multiple mast sections detachably connected to one another. Preferably, the mast is exposed at a rake angle of approximately the reclined angle of the backrest of the seat.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
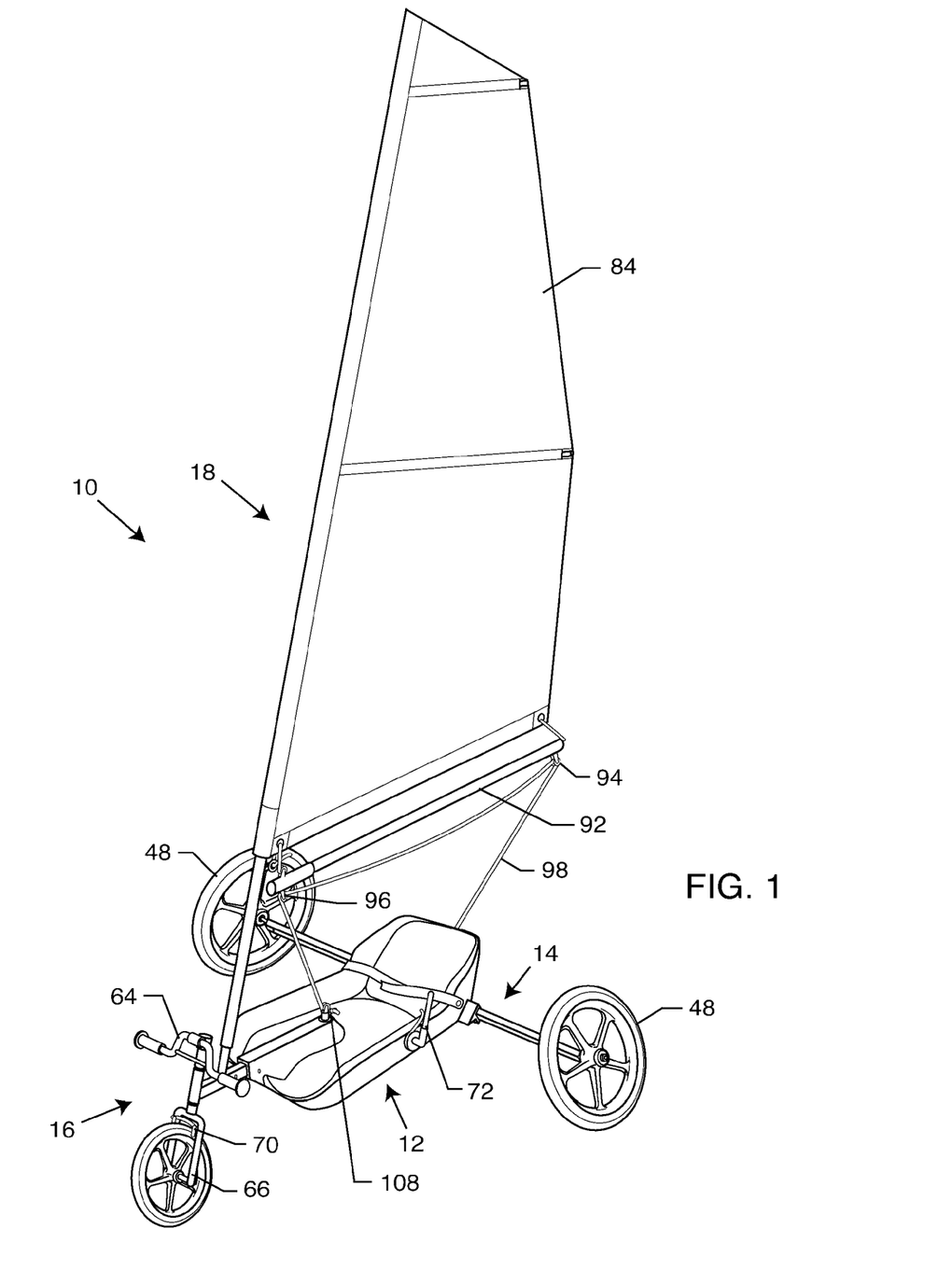
FIG. 1 is a side perspective view of a land sail-propelled vehicle embodying the present invention.

The present invention, as shown in the accompanying drawings for purposes of illustration, resides in a vehicle, generally referred to by the reference 10. The vehicle 10 is generally comprised of a molded support body 12 having a rear axle assembly 14 and a front steering assembly 16 which are adapted to movably engage an underlying solid surface, such as dirt, ice, sand and the like. Means for propulsion 18 are also provided, and typically comprises a sail assembly, as illustrated in FIG. 1. However, as will be more fully described herein, other propulsion means, such as by a kite or animals, such as a team of dogs, are also contemplated by the present invention.

With reference now to FIGS. 7-10, a particularly unique aspect of the present invention is that the vehicle incorporates a one-piece molded body 12. The body 12 is typically comprised of molded plastic or fiberglass so as to have high-strength, be low-weight, and capable of being manufactured at a fairly low cost. During molding, a seat is formed in an upper portion of the body 12, including a backrest 20 and a seat rest 22. In a particularly preferred embodiment, the backrest 20 is reclined so as to dispose the weight of a driver of the vehicle 10 over the center of gravity of the rear axle assembly 14, to provide stability for the vehicle 10. Typically, the backrest 20 is reclined approximately 20° to achieve this effect. Reclining the backrest 20 also lowers the driver so that the driver is placed below the sail assembly 18. This allows the sail assembly 18 to be positioned lower, also increasing stability and the ease of use of the vehicle 10.

The overall length of the support body 12 is typically less than four feet, and usually closer to three feet in length. This length provides many advantages, including the ability to store the body 12 in a tote bag for storage and transportation. Moreover, this length is sufficient that the seat rest 22 positions the driver's knees over the support body while in use. The benefit of this will readily be apparent to those experienced with such land sails as it is common for drivers, and particularly novice drivers, to attempt to stop the vehicle by placing their feet on the ground, causing the vehicle to move over their feet and bended legs and hyperextend their knees. As the driver's knees are positioned above the body 12, given the length of the seat rest 22, the driver of the vehicle of the present invention is not as apt to attempt to stop the vehicle 10 in such a manner. Instead, the vehicle of the present invention utilizes a brake, as will be more fully described herein.

A tubular rear axle guide 24 is either molded into, or bonded to, a rear portion of the support body 12. The rear axle guide 24 is configured to removably receive the rear axle assembly 14, as will be more fully described herein. The support body 12 also includes a tubular port molded into, or bonded to, a front portion of the body 12. The port opening 26 is configured to removably receive the steering assembly 16, as will be more fully described herein. Incorporating the rear axle guide 24 and front port 26 into the molded body 12 provides many advantages, including ease of manufacture, as well as ease of assembling the vehicle 10. As discussed above, prior art land sails are comprised of frame members which must be either connected to one another, or which are welded to one another. The seat is typically a cloth of canvas seat which is stretched across a portion of such prior art frames. Assembly of rear axles, a front axle, wheels, etc., must be made which is fairly complicated and takes much more time than the assembly of the present vehicle 10. Moreover, such metal frames can be large, unwieldy, and heavy. The molded body 12 incorporating the rear axle guide tube 24 and front port tube 26 eliminates these disadvantages.

Figure 2:
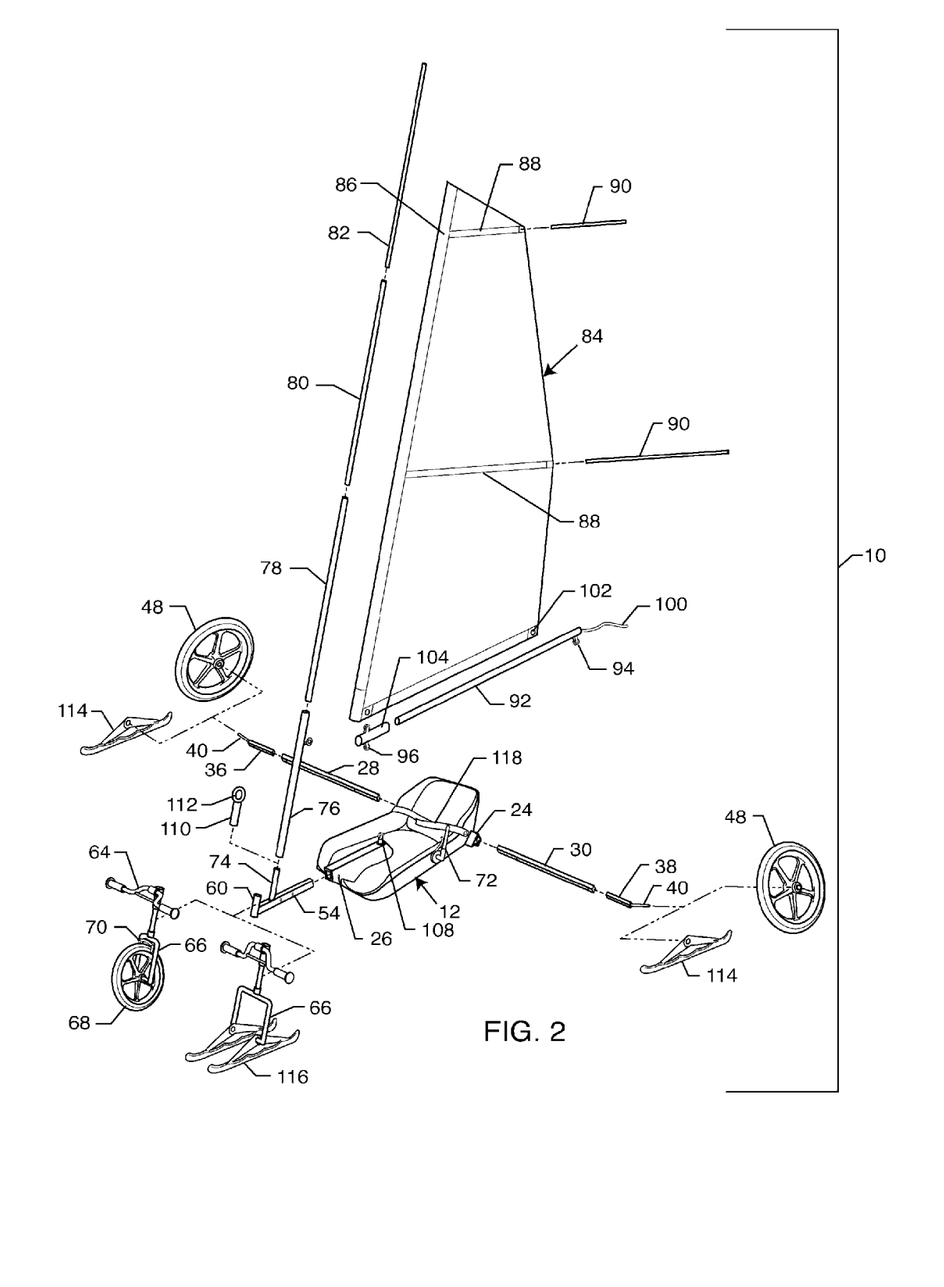
FIG. 2 is an exploded perspective view of the land sail-propelled vehicle of FIG. 1, as well as illustrating various optional components thereof.
Figure 3:
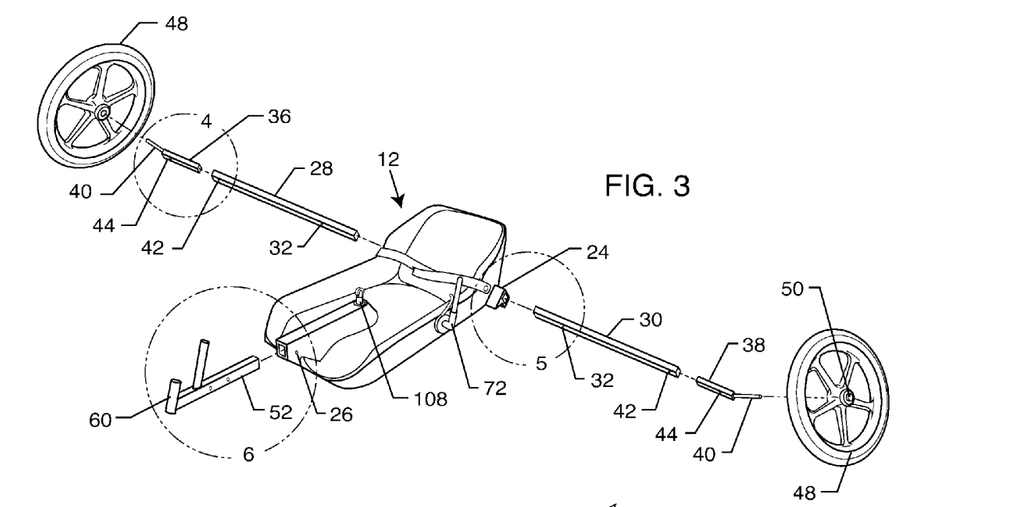
FIG. 3 is a partially exploded perspective view, illustrating insertion of a rear axle assembly and a steering assembly into a molded support body of the vehicle, in accordance with the present invention.
Figure 5:
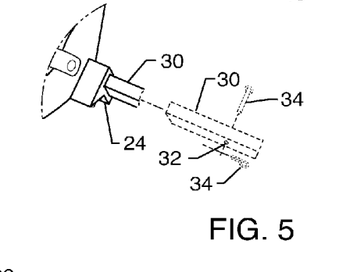
FIG. 5 is a diagrammatic view illustrating the attachment of a rear axle to the support body of the vehicle, in accordance with the present invention.

With reference now to FIGS. 2 and 3, the rear axle assembly 14, in a particularly preferred embodiment, comprises a pair of rear axles 28 and 30. Ends of the axles 28 and 30 are configured to be received within the openings of the rear axle guide 24. As illustrated in FIG. 5, an aperture 32 of the rear axle 28 or 30 is alignable with an aperture of the rear axle guide 24 such that a pin 34 can be inserted through the aligned apertures to to removably lock the axle 28 or 30 in place. The pin 34 can comprise a clevis pin or the like. Of course, the invention contemplates that other means of removably fastening the rear axles 28 and 30 to the rear axle guide 24 and molded body 12 are possible.

Figure 4:
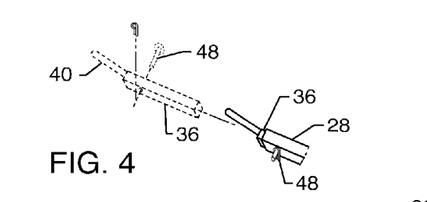
FIG. 4 is a diagrammatic view illustrating extension removably attached to a rear axle of the vehicle.

In a particularly preferred embodiment, no piece of the vehicle 10 is longer than four feet, such that the vehicle can be disassembled and inserted into tote bags of sufficiently light weight so as to be carried and placed within a trunk of an automobile for easy transportation. Thus, extensions 36 and 38 each having an axle 40 are removably attachable to free ends of the rear axles 28 and 30. Such removable attachment of the extension 36 to the rear axle 28 is illustrated in FIG. 4. Apertures 42 and 44 of the rear axle 28 and extension 36 are alignable with one another when the extension 36 is brought into engagement with and inserted into the free end of the rear axle 28. A pin 48 is insertable through the aligned apertures 42 and 44 for securing the extension 36 and axle 28 (and conversely extension 38 and axle 30) to one another. The end bolt 40 on each extension 36 and 38 is preferably angled so that the rear wheels 48 are cambered out from the point of contact with the ground, such as by ten percent, adding to the stability of the vehicle 10 and reducing side slippage or leeway.

In a particularly preferred embodiment of the present invention, the rear axle guide 24 includes multiple interior facets, such as the four illustrated interior surface facets. The rear axles 28 and 30, or at least a portion thereof, include a corresponding number of exterior surface facets such that when the axles 28 and 30 are inserted into the axle guide 24, a degree of engagement exists between the inner and outer surfaces. Moreover, it has been found that aligning the apertures of the axle guide 24 and axles 28 and 30 is facilitated by such an arrangement. Moreover, the axles 28 and 30 will resist rotation within the axle guide 24.

The free end 40 of the extension is typically of reduced diameter and externally threaded such that a wheel 48 or the like can be disposed over the threaded free end 40, and serve as an axle for the wheel 48. In essence, the free end 40 is an elongated bolt, which freely rotatably supports the wheel 48, a nut 50 being threaded onto the end of the bolt 40 to maintain the wheel 48 thereon.

Figure 6:
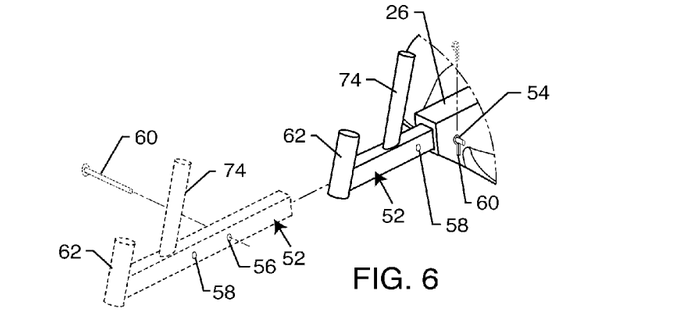
FIG. 6 is a diagrammatic illustration of the attachment of a tube of the steering assembly being removably attached to the support body of the vehicle, in accordance with the present invention.

The steering assembly 16 includes a tube 52 which is insertable into the opening of the front port 26, as shown in FIG. 6. The port 26 includes an aperture 54 on both sides thereof which are alignable with an aperture 56 or 58 of the tube 52 for insertion of a pin 60 therethrough so as to fasten the tube 52 to the body 12, similar to that with the rear axle assembly 14. Preferably, the tube 52 includes a series of apertures 56, 58, etc., which are spaced from one another and which can lengthen or shorten the tube 56 with respect to the body 12 to accommodate riders of different heights, as will be more fully described herein.

A stem 62, comprising a vertically oriented pipe, is fastened to the free end of the tube 52 so as to be in space relation to the body 12. With reference now to FIG. 2, a footbar assembly 64 and a fork assembly 66 are rotatably attached to the stem 60. In one embodiment, a wheel 68 is rotatably connected to the fork assembly 66. To reduce costs of manufacture, the stem 60, footbar 64, and fork assembly 66 are essentially the components of a bicycle handlebar and front wheel assembly. The handlebars 64 are inverted so as to extend downwardly, instead of upwardly, with the rider's feet engaging opposite ends of the handlebars. In a particularly preferred embodiment, the footbar 64 is pivotable along an arc so as to extend towards the body 12 or away from the body 12, so as to further accommodate riders of different heights. For example, a short rider, such as a petite woman or a teenager, could use the vehicle of the present invention by inserting the tube 52 completely into port 26, and extending the footbar 64 towards the body 12 such that the rider's feet would comfortably reach the footbar 64 for steering purposes.

In a particularly preferred embodiment, a brake 70, such as a caliper or disk brake commonly used for bicycles, is operably connected to the front wheel 68. A tension cable extends to a hand brake mechanism 72 attached to the support body 12 in a convenient location such that the rider of the vehicle 10 could grasp and operate the brake 72. The hand brake 72 can be positioned on a handle mount extending from a side of the body 12, as illustrated. In this manner, when disassembling the vehicle 10, the hand brake 72 is detachable from the body 12 and remains with the front steering assembly 16 when transported and stored.

With reference to FIGS. 2 and 6, the front steering assembly tube 52 also includes a crossbar or tube 74 extending upwardly therefrom for attachment to a propulsion means of the vehicle 10. In a particularly referred embodiment, as illustrated, the propulsion means comprises a sail assembly 18. The sail assembly includes a mast, which in the preferred embodiment is comprised of multiple interlocking mast sections 76-82. The number of mast sections 76-82 and the length of each can vary depending upon the size of the sail 84 to be used. However, to keep in accordance with the present invention, the aluminum tubing comprising the mast section 76-82 are typically not more than four feet in length so as to fit within the tote bags previously described. The mast section tubes 76-82 are of increasingly reduced diameter, or the ends thereof are of reduced diameter, such that the tube sections 76-82 can be frictionally fitted into one another, or otherwise interlocked. An elongated sock 86 at the front of the sail 84 extends over the interlocked mast sections 76-82. The lower most mast section 76 is fastened to the upwardly extending crossbar 74 of the front steering assembly. This is a freely rotatable connection such that the sail 84 can be freely moved across a wide angle. It will be appreciated by those skilled in the art that this is necessary in order to adjust the amount of air forced into the sail 84 so as to adjust the speed of the vehicle 10.

Figures 7, 8:
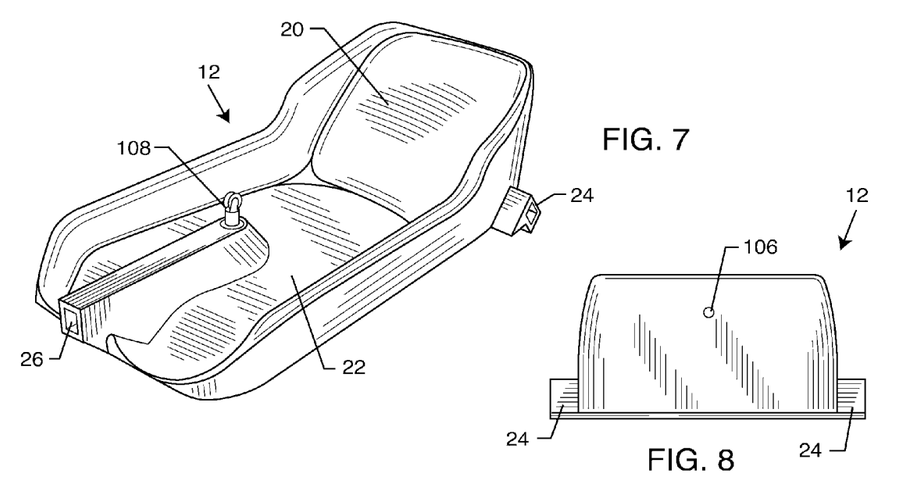
FIG. 7 is a front perspective view of the support body of the vehicle of the present invention.
FIG. 8 is a rear elevational view of the support body.
Figure 9:
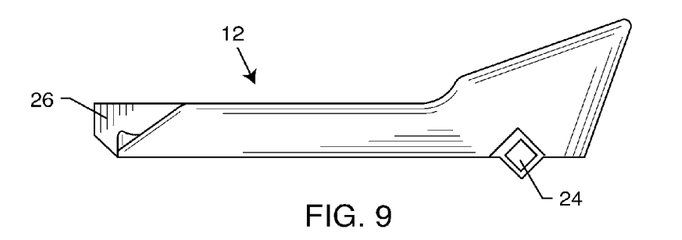
FIG. 9 is a side elevational view of the support body.
Figure 10:
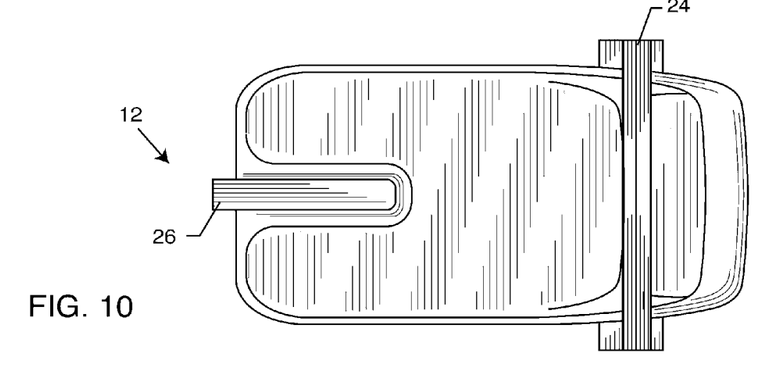
FIG. 10 is a bottom plan view of the support body, illustrating the tubular rear axle guide and tubular port bonded to the body.

The sail 84 also includes one or more passageways 88 extending generally transverse or horizontal to the sail 84 and which are adapted to receive battons 90 therein to give the sail 84 a more defined structure. A boom 92 is operably connected to a lower portion of the sail 84, and includes the necessary eyelets or pulleys 94 and 96 to attach a line of cord 98 from the body 12 to the sail 84 so as to control the angle of the sail 84 by the rider. In particular, a tie-down line 100 extends from one end of the boom 92 and which is attachable to an aperture 102 in the bottom of the sail 84 generally opposite the mast sock 86. The boom 82 may in fact comprise multiple sections 92 and 104 in the event that the boom 92 needs to exceed four feet in length, in accordance with the preferred embodiment. The length of the extension piece 104 can vary depending upon the size of the sail 84 used. The control line typically extends from a rear aperture 106 of the body 12, as illustrated in FIG. 8. The line extends upwardly and connects to the boom 92 and is threaded through the appropriate eyelets, pulleys, etc., to a tie-down or pulley block 108 to a top surface of the body 12, typically disposed so as to be between the legs of the rider. In this manner, the rider can pull the control line 98 or slacken it so as to move the sail 84, as will be appreciated by those skilled in the art.

In a particularly preferred embodiment, the crossbar 74 of the front steering assembly 16 is disposed at an angle such that the sail assembly 18 is raked at an angle towards the body 12. In a particularly preferred embodiment, this angle corresponds with the reclined angle of the backrest 20, or approximately 20°, to move the center of force of the sail 84 back and align it with the rear axle assembly 14 so as to promote the stability of the vehicle 10 during operation.

With reference now to FIG. 2, other means of propulsion are contemplated by the present invention, other than the illustrated sail assembly 18. For example, the vehicle of the present application can be propelled by means of an attached kite, dogs, or other animals. In such instance, instead of attaching a mast section 76 to the crossbar 74 of the steering assembly 16, an extension tube 110 can be operably connected to the crossbar 74. The extension tube 110 includes a ring structure 112 to which the end of a rope attached to the kite, dogs, etc., can be tied to.

With continuing reference to FIG. 2, it will be appreciated that the vehicle 10 of the present invention can be used on surfaces other than hard ground, pavement, etc., which would require the use of wheels 48 and 68. Instead, for example, wheels 48 and 68 could be inflatable so as to be useable on sand and other such surfaces. Moreover, instead of wheels 48, ice blades 114 could be attached to the bolts of the rear axle extensions 36 and 38, and a pair of ice blades 116 to the front forks 66 of the front wheel assembly 16 such that the vehicle 10 can be operated on snow or ice, such as a frozen lake, iced over parking lot, or the like.

To assemble the vehicle 10 of the present invention, due to the molding of the rear tubular axle guide 24 into the support body 12, the rear axles 28 and 30 are merely inserted into the tubular guide 24 and fastened thereto, such as with the pins 34 as described above. The axle extensions 36 and 38 are attached to the axles 28 and 30, respectively, as described above, and the wheels rotatably fastened at the bolt end thereof 40. The front steering assembly 16 is attached to the front of the support body 12 by inserting tube 52 into open port 26 and inserting pins for the aligned apertures, as described above. The hand brake 72 is attached to the body 12, as described above. When using a sail 84, the mast sections 76-82 are innerconnected to one another, and inserted through the front sock or sleeve 86 of the sail 84. The battons 90 are inserted into the sail 84, and the control line 98 and boom 92 are innerconnected between the sail 84 and support body 12. The control or sheet line 98, being attached to the body 12, and run through the blocks on the pulley 108 of the body 12 and boom blocks 94 and 96 enables the control of the direction that the sail 84 is positioned at. The brake 72 can then be released and the vehicle is ready to sail. The assembly of the vehicle 10 can take place in a matter of minutes. The reverse steps are taken to disassemble the vehicle 10. All the components, in a particularly preferred embodiment, can fit within four storage bags, each weighing twenty pounds or less. This enables riders of various ages, sizes, weight and strength to transport, assemble and use the vehicle 10 of the present invention.

When operating the vehicle 10, the motion of the vehicle is created by the passing of wind around the sail 84 which forms an air foil. The wind passing around the air foil develops a forward motion or lift. The key is to maximize the forward motion and remain upright. This is accommodated in two ways, by weight and leverage. Weight has the advantage of keeping the vehicle 10 upright with the disadvantage of slowing the vehicle's forward motion and getting it started from a stop. The vehicle 10 and its rider make up the weight, which is minimized due to the molded body 12. The primary factor, keeping the vehicle upright, is the combination of leverage of the extended axles/wheels from the center line of the body 12 and the weight. The turning over moment is caused by the center point of force on the sail times the distance to the ground. The righting moment is the weight of the vehicle/rider times the distance from the center of the vehicle to the outside end of the rear wheel axle. The righting moment must be greater than the turning moment or the vehicle turns on its side. This assumes the center of effort of the sail and axles are aligned to the front/back center line of the vehicle. Thus, the location of the rear wheels 48, the positioning of the operator, and the position of the sail 84 are all key elements in designing the vehicle 10. The rear sloped backseat 20 and the cambered rear wheels 48 add to the stability of the vehicle 10. When sailing the vehicle 10 of the present invention, the rider leans from side to side, keeping weight on the windward side, therefore keeping the vehicle 10 upright. A seatbelt 114 may be attached to the body and used by the rider to keep the rider on the support body 12 during use of the vehicle 10. The rider uses his or her feet to engage the footbar 64 and turn the front wheel 68 to control the direction of the vehicle 10. Speed can be adjusted by use of the brake 70 as well as the direction of the sail 84 and the amount of wind hitting the sail 84.

It will be readily understood by those skilled in the art that the dimensions of the vehicle 10 can be modified as needed. For example, the boom and mast can be adjusted to carry a sail of greater dimension. This is done, for example, in racing events. When enlarging the size of the sail, the rear axle extensions extending from the body are lengthened as well to prevent the vehicle 10 from tipping over. By removably inserting the rear axle extensions into the body ports, an operator can have substitute parts for a racing vehicle and a purely recreational vehicle while maintaining many components of the vehicle in common so as to avoid unnecessary expense.

Although several embodiments have been described in detail for purposes of illustration, various modifications may be made to each without departing from the scope and spirit of the invention. Accordingly, the invention is not to be limited, except as by the appended claims.

What is claimed is:

1. A land sail-propelled vehicle, comprising:
a one-piece molded body defining a seat in a top surface thereof;
at least one tubular rear axle guide bonded to, or molded into, a rear portion of the body and having an entry opening;
a tubular port bonded to, or molded into, a front portion of the body and having an entry opening;
a rear axle assembly, including at least one rear axle, removably insertable into the at least one rear axle guide, wherein the seat includes a back rest reclined at an angle determined to position a user's center of gravity over the rear axle assembly;
a steering assembly removably insertable into the port;
means for movably engaging an underlying solid surface attached to generally opposite ends of the rear axle assembly and the steering assembly; and
a sail assembly, having a mast disposed at a rake angle of approximately the reclined angle of the back rest of the seat.

2. The vehicle of claim 1, wherein the movably engaging means comprises a tire, a ski, or an ice blade.

3. The vehicle of claim 1, wherein the body is comprised of molded plastic or fiberglass.

4. A land sail-propelled vehicle, comprising:
a one-piece molded body defining a seat in a top surface thereof;
at least one tubular rear axle guide bonded to, or molded into, a rear portion of the body and having an entry opening;
a tubular port bonded to, or molded into, a front portion of the body and having an entry opening;
a rear axle assembly, including at least one rear axle, removably insertable into the at least one rear axle guide;
a steering assembly removably insertable into the port; and
means for movably engaging an underlying solid surface attached to generally opposite ends of the rear axle assembly and the steering assembly;
wherein an inner surface of the tubular rear axle guide is multi-faceted, and wherein the at least one rear axle comprises a multi-faceted tube adapted to be insertable into the rear axle guide.

5. The vehicle of claim 4, wherein the rear axle guide includes an aperture alignable with an aperture of the at least one rear axle for insertion of a pin therethrough to fasten the at least one rear axle to the rear axle guide and body.

6. A land sail-propelled vehicle, comprising:
a one-piece molded body defining a seat in a top surface thereof;
at least one tubular rear axle guide bonded to, or molded into, a rear portion of the body and having an entry opening;
a tubular port bonded to, or molded into, a front portion of the body and having an entry opening;
a rear axle assembly, including at least one rear axle, removably insertable into the at least one rear axle guide;
a steering assembly removably insertable into the port; and
means for movably engaging an underlying solid surface attached to generally opposite ends of the rear axle assembly and the steering assembly;
wherein the movably engaging means comprises a tire, a ski, or an ice blade; and
wherein the rear axle assembly includes two rear axles removably insertable into opposite openings of the rear axle guide tube, and an extension removably attachable to an opposite end each of the rear axles, the extension including a threaded portion at a free end thereof for removable attachment of the tire, ski or the ice blade.

7. A land sail-propelled vehicle, comprising:
a one-piece molded body defining a seat in a top surface thereof;
at least one tubular rear axle guide bonded to, or molded into, a rear portion of the body and having an entry opening;
a tubular port bonded to, or molded into, a front portion of the body and having an entry opening;
a rear axle assembly, including at least one rear axle, removably insertable into the at least one rear axle guide;
a steering assembly removably insertable into the port; and
means for movably engaging an underlying solid surface attached to generally opposite ends of the rear axle assembly and the steering assembly;
wherein the steering assembly comprises a tube having a first end adapted to be removably insertable into the opening of the front port, a stem attached to a second end of the tube and having a footbar and a fork rotatably attached thereto, and a cross bar extending upwardly from the tube and adapted to attach to a means for propulsion.

8. The vehicle of claim 7, wherein the tube includes a series of apertures alignable with an aperture formed in the port for adjustably securing the tube thereto.

9. The vehicle of claim 7, wherein the foot bar is pivotably connected to the stem.

10. The vehicle of claim 7, wherein the propulsion means comprises a sail assembly, including a mast detachably connected to the cross bar of the steering assembly, a sail attached to the mast, and a boom operably connected to the sail.

11. The vehicle of claim 10, wherein the mast comprises multiple mast sections detachably connected to one another.

12. The vehicle of claim 7, wherein the seat includes a back rest reclined at an angle determined to position a user's center of gravity over the rear axle assembly.

13. The vehicle of claim 12, including a sail assembly, having a mast disposed at a rake angle of approximately the reclined angle of the back rest of the seat.

14. A land sail-propelled vehicle, comprising:
a one-piece body comprised of molded plastic or fiberglass defining a seat in a top surface thereof;
means for propelling the vehicle operably connected to the body;
at least one tubular rear axle guide bonded to, or molded into, a rear portion of the body and having an entry opening;
a rear axle assembly, including at least one rear axle removably insertable into the at least one rear axle guide;
a tubular port bonded to, or molded into, a front portion of the body and having an entry opening;
a steering assembly removably insertable into the port, the steering assembly including a tube having a first end adapted to be removably insertable into the opening of the front port, a stem attached to a second end of the tube and having a footbar and a fork rotatably attached thereto, and a cross bar extending upwardly from the tube and adapted to attach to the means for propulsion; and
tires or ice blades attached to generally opposite ends of the rear axle assembly and the steering assembly;
wherein the seat includes a back rest reclined at an angle to position a user's center of gravity over the rear axle assembly; and
wherein the propulsion means comprises a sail assembly, including a mast detachably connected to the cross bar of the steering assembly, a sail attached to the mast, and a boom operably connected to the sail.

15. A land sail-propelled vehicle, comprising:
a one-piece body comprised of molded plastic or fiberglass defining a seat in a top surface thereof;
means for propelling the vehicle operably connected to the body;
at least one tubular rear axle guide bonded to, or molded into, a rear portion of the body and having an entry opening;
a rear axle assembly, including at least one rear axle removably insertable into the at least one rear axle guide;
a tubular port bonded to, or molded into, a front portion of the body and having an entry opening;
a steering assembly removably insertable into the port, the steering assembly including a tube having a first end adapted to be removably insertable into the opening of the front port, a stem attached to a second end of the tube and having a footbar and a fork rotatably attached thereto, and a cross bar extending upwardly from the tube and adapted to attach to the means for propulsion; and
tires or ice blades attached to generally opposite ends of the rear axle assembly and the steering assembly;
wherein the seat includes a back rest reclined at an angle to position a user's center of gravity over the rear axle assembly;
wherein an inner surface of the tubular rear axle guide is multi-faceted, and wherein the at least one rear axle comprises a multi-faceted tube adapted to be insertable into the rear axle guide.

16. A land sail-propelled vehicle, comprising:
a one-piece body comprised of molded plastic or fiberglass defining a seat in a top surface thereof;
means for propelling the vehicle operably connected to the body;
at least one tubular rear axle guide bonded to, or molded into, a rear portion of the body and having an entry opening;
a rear axle assembly, including at least one rear axle removably insertable into the at least one rear axle guide;
a tubular port bonded to, or molded into, a front portion of the body and having an entry opening;
a steering assembly removably insertable into the port, the steering assembly including a tube having a first end adapted to be removably insertable into the opening of the front port, a stem attached to a second end of the tube and having a footbar and a fork rotatably attached thereto, and a cross bar extending upwardly from the tube and adapted to attach to the means for propulsion; and
tires or ice blades attached to generally opposite ends of the rear axle assembly and the steering assembly;
wherein the seat includes a back rest reclined at an angle to position a user's center of gravity over the rear axle assembly;
wherein the rear axle guide includes an aperture alignable with an aperture of the at least one rear axle for insertion of a pin therethrough to fasten the at least one rear axle to the rear axle guide and body.

17. A land sail-propelled vehicle, comprising:
a one-piece body comprised of molded plastic or fiberglass defining a seat in a top surface thereof;
means for propelling the vehicle operably connected to the body;
at least one tubular rear axle guide bonded to, or molded into, a rear portion of the body and having an entry opening;
a rear axle assembly, including at least one rear axle removably insertable into the at least one rear axle guide;
a tubular port bonded to, or molded into, a front portion of the body and having an entry opening;
a steering assembly removably insertable into the port, the steering assembly including a tube having a first end adapted to be removably insertable into the opening of the front port, a stem attached to a second end of the tube and having a footbar and a fork rotatably attached thereto, and a cross bar extending upwardly from the tube and adapted to attach to the means for propulsion; and
tires or ice blades attached to generally opposite ends of the rear axle assembly and the steering assembly;
wherein the seat includes a back rest reclined at an angle to position a user's center of gravity over the rear axle assembly;

wherein the rear axle assembly includes two rear axles removably insertable into opposite openings of the rear axle guide tube, and an extension removably attachable to an opposite end each of the rear axles, the extension including a threaded portion at a free end thereof for removable attachment of the tire or the ice blade.

18. A land sail-propelled vehicle, comprising:
a one-piece body comprised of molded plastic or fiberglass defining a seat in a top surface thereof;
means for propelling the vehicle operably connected to the body;
at least one tubular rear axle guide bonded to, or molded into, a rear portion of the body and having an entry opening;
a rear axle assembly, including at least one rear axle removably insertable into the at least one rear axle guide;
a tubular port bonded to, or molded into, a front portion of the body and having an entry opening;
a steering assembly removably insertable into the port, the steering assembly including a tube having a first end adapted to be removably insertable into the opening of the front port, a stem attached to a second end of the tube and having a footbar and a fork rotatably attached thereto, and a cross bar extending upwardly from the tube and adapted to attach to the means for propulsion; and
tires or ice blades attached to generally opposite ends of the rear axle assembly and the steering assembly;
wherein the seat includes a back rest reclined at an angle to position a user's center of gravity over the rear axle assembly;
wherein the steering assembly tube includes a series of apertures alignable with an aperture formed in the port for adjustably securing the tube thereto or the foot bar is pivotably connected to the stem to accommodate users of different height.

19. The vehicle of claim 18, wherein the propulsion means comprises a sail assembly, including a mast detachably connected to the cross bar of the steering assembly, a sail attached to the mast, and a boom operably connected to the sail.

20. The vehicle of claim 14, wherein the mast comprises multiple mast sections detachably connected to one another.

21. The vehicle of claim 14, wherein the mast is disposed at a rake angle of approximately the reclined angle of the back rest of the seat.

22. A land sail-propelled vehicle, comprising:
a one-piece body comprised of molded plastic or fiberglass defining a seat in a top surface thereof;
at least one tubular rear axle guide bonded to, or molded into, a rear portion of the body and having an entry opening;
a rear axle assembly, including at least one rear axle removably insertable into the at least one rear axle guide;
a tubular port bonded to, or molded into, a front portion of the body and having an entry opening;
a steering assembly removably insertable into the port, the steering assembly including a tube having a first end adapted to be removably insertable into the opening of the front port, a stem attached to a second end of the tube and having a footbar and a fork rotatably attached thereto, and a cross bar extending upwardly from the tube;
a sail assembly, including a mast detachably connected to the cross bar of the steering assembly, a sail attached to the mast, and a boom operably connected to the sail, wherein the mast comprises multiple mast sections detachably connected to one another;
tires or ice blades attached to generally opposite ends of the rear axle assembly and the steering assembly;
wherein the seat includes a back rest reclined at an angle to position a user's center of gravity over the rear axle assembly;
wherein an inner surface of the tubular rear axle guide is multi-faceted, and wherein the at least one rear axle comprises a multi-faceted tube adapted to be insertable into the rear axle guide;
wherein the rear axle guide includes an aperture alignable with an aperture of the at least one rear axle for insertion of a pin therethrough to fasten the at least one rear axle to the rear axle guide and body; and
wherein the rear axle assembly includes two rear axles removably insertable into opposite openings of the rear axle guide tube, and an extension removably attachable to an opposite end each of the rear axles, the extension including a threaded portion at a free end thereof for removable attachment of the tire or the ice blade.

* * * * *